United States Patent Office 3,455,993
Patented July 15, 1969

3,455,993
4,4'-BIPHENYL AND DIPHENYL ETHER CARBOXYLIC ACIDS AND ESTERS
David R. Gildersleve, Minster, near Ramsgate, and Michael S. Tute, Canterbury, England, assignors to Chas. Pfizer & Co., Inc., New York, N.Y., a corporation of Delaware
No Drawing. Filed Sept. 21, 1965, Ser. No. 489,067
Claims priority, application Great Britain, Oct. 13, 1964, 41,676/64
Int. Cl. C07c 69/76
U.S. Cl. 260—473                                13 Claims

ABSTRACT OF THE DISCLOSURE

Novel antiviral agents of the formulae:

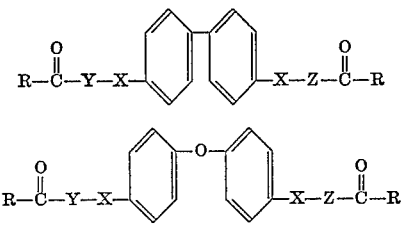

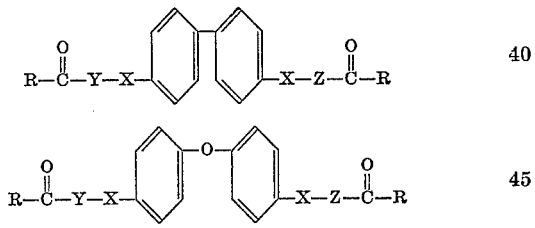

wherein X is carbonyl or methylene; Y and Z are each alkylene of from 1 to 3 carbon atoms, R is hydroxy, amino, monoalkylamino, dialkylamino and alkyloxy and the preparation thereof.

This invention relates to certain novel and useful diphenyl compounds. In particular, it is concerned with 4,4'-disubstituted diphenyl derivatives which can be represented by the following structural formulae:

wherein X is selected from the group consisting of carbonyl and methylene; Y and Z are each alkylene containing from 1 to 8 carbon atoms, provided that when the benzene nuclei are linked by an oxygen atom Y and Z each contain at least 2 carbon atoms and their sum is at least 5 carbon atoms; and R is selected from the group consisting of hydroxy, amino, N-lower-alkylamino, N,N-di-lower-alkylamino, and lower alkyloxy. The term "lower alkyl" indicates alkyl containing from 1 to 5 carbon atoms. It is understood that carbon skeleton branching is possible with regard to Y and Z and such isomers are within the scope of this invention.

Preferred members of the class of compounds designated by the general structural formulas above are:

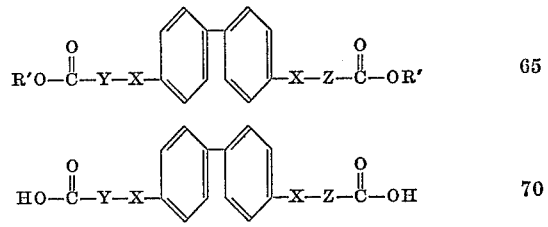

and

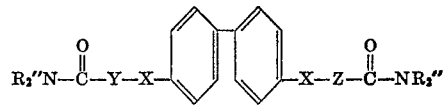

and the corresponding diphenyl ether analogs thereof wherein X, Y and Z are as defined above, R' is alkyl of from 1 to 5 carbon atoms, and R" is either H or alkyl of from 1 to 5 carbon atoms.

Specific examples of such compounds are: 4,4'-bis-(3-carbobutoxypropionyl)biphenyl; 4,4' - bis - (3 - carboxypropyl)biphenyl; 4,4' - bis - (2,3 - dimethyl - 3 - carbomethoxypropionyl)biphenyl; 4,4' - bis - (5 - carbopropoxyvaleryl)diphenyl ether; 4,4' - bis - (6 - carboethoxycaproyl)biphenyl; and 4,4' - bis - (6-carboxyhexyl)diphenyl ether.

The novel compounds contemplated by the scope of this invention can be prepared by a series of facile steps, all of which comprise standard organic reactions familiar to those versed in the art. The first step, a Friedel-Crafts reaction, is essentially the principal step which provides the key intermediate for the ensuing reactions. Such a key intermediate lends itself nicely to various chemical treatments which result in the formation of various desirable derivatives. This can best be illustrated by the following reaction scheme:

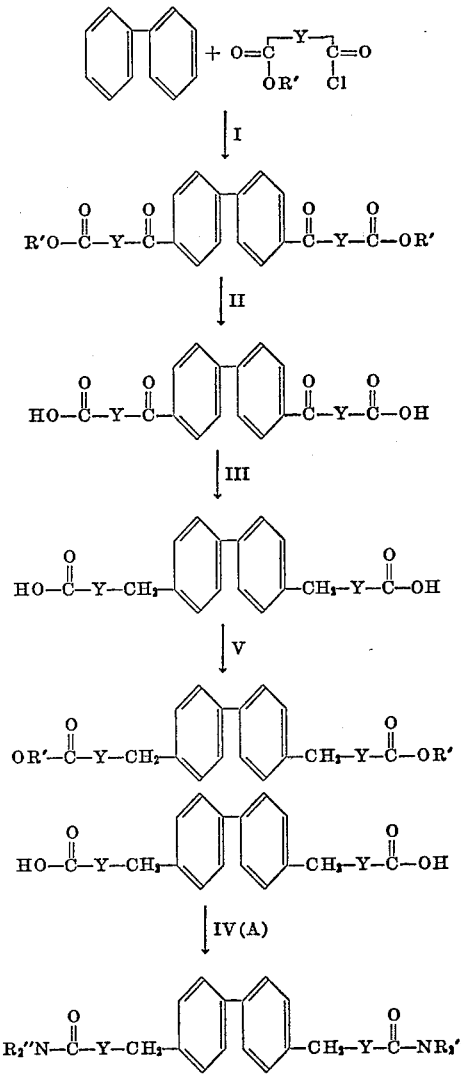

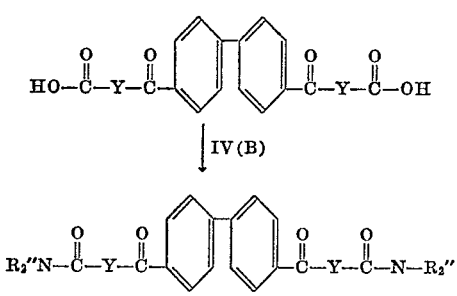

wherein Y is as defined earlier, R' is lower alkyl, and R" is either H or lower alkyl. Of course, it is understood that the corresponding diphenyl ether analogs, i.e. where the phenyl rings are connected by means of an oxygen atom, will undergo the same reaction sequence and, in fact, are prepared in the same manner.

Reaction step I is an example of the well known Friedel-Crafts reaction which in this embodiment consists of reacting biphenyl or diphenyl ether with a half-ester, half-acid halide of a dibasic acid in the presence of a Lewis acid catalyst in a suitable solvent. Typical examples of Lewis acid catalysts are aluminum chloride and boron trifluoride. Carbon disulfide, sym. tetrachloroethane, and methylene chloride are suitable inert solvents which may be used for this reaction. Of course, to prepare compounds in which Y and Z are different, successive Friedel-Crafts reactions are carried out. For example, biphenyl may be reacted first with methyl succinyl chloride to yield a 4-mono-substituted biphenyl and subsequently with a different half-ester, half-acid chloride, for instance, methyl α-ethylsuccinyl chloride to provide the corresponding 4,4'-bis-substituted biphenyl. The work-up pertaining to this Friedel-Crafts reaction step consists of hydrolysis, evaporation of solvent and recrystallization of the solid product. For recrystallizing purposes, acetone has been found to be an effective solvent.

Reaction step II is a straight-forward basic hydrolysis step which results in the conversion of the diester to the corresponding diacid. Generally, a mixture of diester and a slight excess of 0.5 N NaOH solution is heated for a period of ½–2 hours, subsequently cooled, acidified and extracted with ether. The separated organic layer is evaporated leaving a residue of crystalline product which may be recrystallized from a suitable solvent, for example, methoxyethanol. The next step, i.e. the reaction step III, is a reduction step, and more specifically a Wolff-Kishner reduction which converts the α-carbonyl function, i.e. the carbonyl functions adjacent to the benzene rings to methylene functions.

The Wolff-Kishner modification utilized herein entails the decomposition under alkaline conditions of the hydrazone derivative obtained by the treatment of compounds provided by reaction step II, i.e. the keto compounds, with hydrazine.

Both acid derivatives, that is the reduced and precursor non-reduced acids, may be converted to their corresponding carboxamides, N-substituted-, and N,N'-disubstituted carboxamides by initially forming the acid chloride by treatment with thionyl chloride and subsequently reacting the aforesaid intermediate acid chloride with ammonia or an appropriate primary or secondary amine.

The above sequence of reactions, steps IV(A) and IV(B), consists of treating the reduced diacid or the precursor non-reduced acid dissolved in a suitable solvent, for instance, ether, petroleum ether, etc., with an excess of thionyl chloride, and after a sufficient reaction period, removing solvent and excess thionyl chloride under reduced pressure at low temperatures. The resulting acid chloride is immediately dissolved in a dry solvent so that the next step can be effected in a continuous manner. Once the solvent, for example, benzene, has been added, the amine reagent can be added. The term "amine reagent" includes ammonia, primary and secondary amines. Furthermore, it is understood that if the "amine reagent" is a gas, it is bubbled directly into the acid chloride solution until saturation is reached, whereas a liquid amine reagent may be weighed beforehand and subsequently added to the acid chloride solution. After the addition of such an amine reagent, the mixture is allowed to stand for about 2 to 3 hours, filtered to remove amine salts, and the filtrate evaporated almost to dryness. The crystalline acid amide so obtained is filtered and dried to give a substantial yield of product.

Reaction step V relates to the esterification of the reduced diacids which are prepared by the method of step III. These esters are obtained by any possible means of esterification such as, alkylating with alkyl sulfate, alkyl halides or diazomethane, the latter specifically for preparing methyl esters.

The reaction products obtained by reaction steps I, II and III, in addition to being effective antiviral agents as such, serve as useful intermediates in the overall reaction sequence. Hence, their utility is manifested in two distinct ways, i.e. as useful products by themselves and as useful intermediates to prepare other useful compounds.

Further, the present invention contemplates, in one of its embodiments, the pharmaceutically-acceptable base addition salts of the diacids described herein. The bases which are used to prepare the pharmaceutically base salts of the diacids of this invention are those which form non-toxic salts containing pharmaceutically-acceptable cations, such as the alkali metal, alkaline earth metal, ammonium or water-soluble amine addition salts like the lower alkanolamine and other base salts with organic amines. Preferred members of this group include the sodium potassium, magnesium, calcium and ethanolamine salts. The conversion to base addition salts comprises treating the diacid with a substantially equivalent amount of a chosen base in an aqueous solution or in a suitable organic solvent such as methanol or ethanol.

The compounds of this invention have been found to be effective antiviral compounds. More particularly, they have been found to possess striking activity against influenza virus. They may be administered either alone or preferably in combination with a pharmaceutically-acceptable carrier. For example, they may be administered orally in the form of tablets containing such excipients as starch, milk/sugar and various types of clay, or in capsules, either alone or in admixture with excipients, or in the form of elixirs or suspension containing flavoring or coloring agents. The compounds can also be administered in the form of a spray directly to the upper respiratory tract. On a body-weight basis, a dosage of about 1 to about 100 milligrams per kilogram per day is appropriate. The physician will determine the dosage which will be most suitable for an individual patient and it will vary with age, the weight and response of the particular patient. The above dosages are exemplary of the average host. There can, of course, be individual cases where higher or lower dosage ranges are merited, and such are within the scope of this invention.

The following examples are provided by way of illustration and should not be interpreted as limiting the invention, many variations of which are possible without departing from the spirit or scope thereof.

EXAMPLE I 4,4'-bis(3-carbomethoxypropionyl)biphenyl

Powdered anhydrous aluminum chloride (88.0 g., 0.66 M) is suspended in carbon disulfide (200 ml.) and methyl succinyl chloride (45.1 g., 0.3 M) is added slowly into the stirred suspension over a twenty minute period. The resulting mixture is stirred for an additional thirty minutes whereupon a solution of biphenyl (15.5 g., 0.1 M) in carbon disulfide (80 ml.) is added while stirring. The rate of addition is such as to maintain a gentle reflux. After the addition of the biphenyl solution, the ensuing mixture is gently heated until evolution of hydrogen chloride desists. Carbon disulfide is then removed by distillation, and ice is cautiously added to the residue. Concentrated hydrochloric acid (20 ml.) is then added, and the residual carbon disulfide is removed by steam distillation. The solid present in the residual acid liquor is filtered off and recrystallized from acetone. The product is obtained as colorless leaflets. M.P. 136.5–137° C.

*Analysis.*—Calculated for $C_{22}H_{22}O_6$: C, 69.10%; H, 5.76%. Found: C, 68.78%; H, 5.53%.

EXAMPLE II 4,4'-bis(4-carboethoxybutyryl)biphenyl

The above product is prepared using the procedure outlined in Example I wherein a stoichiometric equivalent amount of ethyl glutaryl chloride is used in lieu of methyl succinyl chloride with comparable results. The product formed colorless plates, M.P. 104–105° C.

*Analysis.*—Calculated for $C_{26}H_{30}O_6$: C, 71.21%; H, 6.9%. Found: C, 71.04%; H, 6.87%.

EXAMPLE III 4,4'-bis(4-carboethoxybutyryl)diphenyl ether

The above product is prepared using the procedure outlined in Example I wherein a stoichiometric equivalent amount of diphenyl ether and ethyl glutaryl chloride are utilized in place of biphenyl and methyl succinyl chloride respectively and comparable results are obtained. The product formed colorless plates, M.P. 76–77° C.

*Analysis.*—Calc'd for $C_{26}H_{30}O_7$: C, 68.70%; H, 6.65%. Found: C, 68.69%; H, 6.65%.

EXAMPLE IV

The procedure of Example I is repeated for the preparation of 4,4'-bis(3-carbobutoxypropionyl)biphenyl, 4,4'-bis(3-carbopropoxypropionyl)biphenyl, 4,4'-bis(3-carbopentoxypropionyl)biphenyl and 4,4'-bis(3-carboethoxypropionyl)biphenyl in which butyl, propyl, pentyl and ethyl succinyl chloride, respectively, are used in place of methyl succinyl chloride with comparable results.

EXAMPLE V

The procedure of Example III is repeated for the preparation of the corresponding 4-carbomethoxy, carbopropoxy, carbobutoxy, and carbopentoxy diphenyl ether derivatives wherein methyl, propyl, butyl, and pentyl glutaryl chloride are used in lieu of ethyl glutaryl chloride with comparable results.

EXAMPLE VI

The preparation of the ensuing compounds is achieved by means of the procedure described in Example I wherein stoichiometric equivalent amounts of the below cited reagents in lieu of methyl succinyl chloride are reacted with biphenyl and substantial yields of products are obtained:

| Reagent | Product |
| --- | --- |
| Methyl α-methylmalonyl chloride | 4,4'-bis(2-methyl, 2-carbomethoxyacetyl)biphenyl. |
| Methyl α-ethylmalonyl chloride | 4,4'-bis(2-ethyl, 2-carbomethoxyacetyl)biphenyl. |
| Methyl α-propylmalonyl chloride | 4,4'-bis(2-propyl, 2-carbomethoxyacetyl)biphenyl. |
| Methyl α-isopropylmalonyl chloride | 4,4'-bis(2-isopropyl, 2-carbomethoxyacetyl)biphenyl. |
| Methyl α-methylsuccinyl chloride | 4,4'-bis(2-methyl, 3-carbomethoxypropionyl)biphenyl. |
| Methyl α-ethylsuccinyl chloride | 4,4'-bis(2-ethyl, 3-carbomethoxypropionyl)biphenyl. |
| Methyl α,β-dimethylsuccinyl chloride. | 4,4'-bis(2,3-dimethyl, 3-carbomethoxypropionyl)biphenyl. |
| Methyl β-methylglutaryl chloride | 4,4'-bis(3-methyl-4-carbomethoxybutyryl)biphenyl. |
| Methyl δ-methyladipyl chloride | 4,4'-bis(5-methyl-5-carbomethoxyvaleroyl)biphenyl. |
| Methyl pimelyl chloride | 4,4'-bis(6-carbomethoxycaproyl)biphenyl. |
| Methyl 6-methylpimelyl chloride | 4,4'-bis(6-methyl-6-carbomethoxycaproyl)biphenyl. |
| Methyl azelyl chloride | 4,4'-bis(8-carbomethoxycapryloyl)biphenyl. |
| Methyl sebacyl chloride | 4,4'-bis(9-carbomethoxypelargonoyl)biphenyl. |

In a similar manner, diphenyl ether is substituted for biphenyl and reacted with the reagents cited above to give the corresponding diphenyl ether derivatives in substantial amounts.

EXAMPLE VII 4,4'-bis(3-carboxypropionyl)biphenyl

The dimethyl ester, 4,4'-bis(3-carbomethoxypropionyl) biphenyl, prepared by the procedure of Example I is converted to the corresponding diacid by means of alkaline hydrolysis. Said alkaline hydrolysis comprises heating a mixture of the dimethyl ester and a slight excess of 0.5 N NaOH solution for a period of 2 hours. The resulting mixture is cooled, acidified with dil. HCl solution and extracted with ether. The organic layer is separated, dried and distilled under partial vacuum to remove solvent leaving a residue of crystalline product. Recrystallization from methoxyethanol yields cream-colored needles, M.P. 303° C.

EXAMPLE VIII 4,4'-bis(4-carboxybutyryl)biphenyl

The diethyl ester, 4,4'-bis(4-carboethoxybutyryl)biphenyl, prepared by the procedure of Example II is converted to the corresponding diacid by the method of the alkaline hydrolysis procedure described in Example VII. The product is recrystallized from dioxane to give colorless leaflets, M.P. 250–255° C.

*Analysis.*—Calc'd for $C_{22}H_{22}O_6$: C, 69.10%; H, 5.80%. Found: C, 69.04%; H, 5.62%.

EXAMPLE IX 4,4'-bis-(4-carboxybutyryl)diphenyl ether

The diethyl ester, 4,4'-bis(4-carboethoxybutyryl)diphenyl ether, prepared by the procedure of Example III is converted to the corresponding diacid by the method of the alkaline hydrolysis procedure described in Example VII. The product is recrystallized from an acetone-10% acetic acid mixture to give colorless leaflets, M.P. 168–170° C.

*Analysis.*—Calc'd for $C_{22}H_{22}O_7$: C, 66.32%; H, 5.57%. Found: C, 66.16%; H, 5.49%.

EXAMPLE X

The diesters enumerated in Examples IV, V and VI are converted to their corresponding diacids in accordance with the method outlined in Example VII with comparable results.

EXAMPLE XI 4,4'-bis(3-carboxypropyl)biphenyl

To a solution prepared by reacting sodium (2.3 g.) with ethylene glycol (70 ml.) is added 4,4'-bis(3-carboxypropionyl)biphenyl (5.5 g., 0.016 M). Hydrazine hydrate (90%; 5 ml.) is then added and the mixture heated under reflux for one hour. After this time period, the resulting mixture is heated to distill off water and some ethylene glycol until the internal temperature reaches 200° C. The residue is then heated under reflux for 3 hours, whereupon the mixture is cooled and acidified with hydrochloric acid. The solid which forms is recrystallized from aqueous acetic acid to give 4 g. of 4,4'-bis(3-carboxypropyl)biphenyl (80%), M.P. 185° C.

EXAMPLE XII 4,4'-bis(4-carboxybutyl)biphenyl

The above product is prepared following the method of Example XI wherein a stoichiometric equivalent amount of 4,4'-bis(4-carboxybutyryl)biphenyl is utilized in place of 4,4'-bis-(3-carboxypropionyl)biphenyl with comparable results. The resulting product is recrystallized from aqueous acetic acid to give colorless crystals, M.P. 247–250° C.

*Analysis.*—Calc'd for $C_{22}H_{26}O_4$: C, 75.20%; H, 7.34%. Found: C, 75.23%; H, 7.34%.

EXAMPLE XIII 4,4'-bis(4-carboxybutyl)diphenyl ether

The above product is prepared following the procedure of Example XI wherein a stoichiometric equivalent amount of 4,4'-bis(4-carboxybutyryl)diphenyl ether is utilized in place of 4,4'-bis(3-carboxypropionyl)biphenyl with comparable results.

EXAMPLE XIV

The diacids cited in Example X are subjected to a Wolff-Kishner reduction as outlined in Example XI to give the corresponding reduced acids in substantial amounts.

EXAMPLE XV

The conversion of 4,4'-bis(3-carboxypriopionyl)biphenyl, 4,4'-bis(4-carboxybutyryl)biphenyl, 4,4'-bis(4-carboxybutyryl)diphenyl ether, the diacids cited in Example X and the reduced diacid derivatives thereof to carboxamides, N-substituted carboxamides, and N,N-disubstituted carboxamides is carried out in the following manner.

To the diacid dissolved in a suitable solvent, for example, ether, is added an excess of thionyl chloride. The resulting mixture is allowed to stand for 3 to 4 hours, whereupon the solvent and excess thionyl chloride is removed under reduced pressure. The dried, crude acid chloride derivative is then dissolved in an appropriate solvent, for instance, benzene and excess of an amine reagent is added. The term "amine reagent" includes ammonia, primary, and secondary amines. It is understood that if the "amine reagent" is a gas, it is bubbled into the acid chloride solution until saturation is reached whereas a liquid amine reagent may be weighed beforehand and subsequently added to the acid chloride solution. After addition of such an amine reagent, the mixture is allowed to stand for 2-3 hours, filtered to remove amine salts, and the filtrate evaporated almost to dryness. The crystalline acid amine is filtered and dried to give a substantial yield of product.

Utilizing the above described procedure, the aforementioned diacids are converted to their corresponding acid chlorides and then reacted with the following amine reagents: ammonia, methyl amine, ethyl amine, propyl amine, butyl amine, dimethyl amine, diethyl amine, dipropyl amine dibutyl amine.

Substantial amounts of product are obtained in each instance.

EXAMPLE XVI

The diacid derivatives disclosed herein which includes the reduced derivatives may be converted to their base additional salts by the following general procedure: To a water solution containing the diacid compound (1 M) is added a stoichiometric equivalent amount of a suitable base. The resulting solution is subsequently stripped free of solvent and the precipitate, the base addition salt, is filtered and dried. Other suitable solvents, for example, methanol, ethanol or aqueous mixtures thereof may be used. Using the aforementioned procedure, the diacids enumerated in Examples VII, VIII, IX and X and the reduced diacid derivatives thereof are reacted with the following bases and conversion to the corresponding base addition salts is effected in substantial yields: sodium hydroxide, potassium hydroxide, calcium hydroxide, magnesium hydroxide, ammonium hydroxide, triethanolamine.

What is claimed is:

1. A compound selected from the group consisting of those of the formulae:

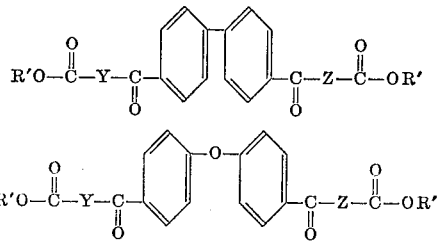

wherein Y and Z are each alkylene containing from 1 to 8 carbon atoms provided that when the benzene nuclei are linked by an oxygen atom, Y and Z each contain at least 2 carbon atoms and the sum of Y and Z is at least 5 carbon atoms; and R' is alkyl containing from 1 to 5 carbon atoms.

2. A compound selected from the group consisting of those of the formulae:

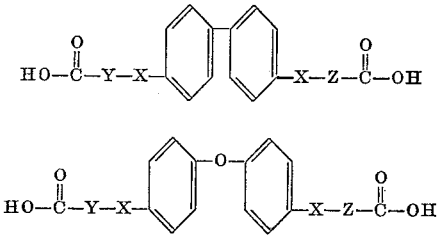

and the pharmaceutically-acceptable base addition salts thereof, wherein X is selected from the group consisting of carbonyl and methylene; Y and Z are each alkylene containing from 1 to 8 carbon atoms provided that when the benzene nuclei are linked by an oxygen atom Y and Z each contain at least 2 carbon atoms and the sum of Y and Z is at least 5 carbon atoms.

3. A compound as in claim 2 wherein X is carbonyl.
4. A compound as in claim 2 wherein X is methylene.
5. The compound 4,4'-bis-(3-carbomethoxypropionyl)biphenyl.
6. The compound 4,4'-bis-(4-carboethoxybutyryl)biphenyl.
7. The compound 4,4'-bis-(4-carboethoxybutyryl)diphenyl ether.
8. The compound 4,4'-bis-(3-carboxypropionyl)biphenyl.
9. The compound 4,4'-bis-(3-carboxypropyl)biphenyl.
10. The compound 4,4'-bis-(4-carboxybutyryl)biphenyl.
11. The compound 4,4'-bis-(4-carboxybutyl)biphenyl.
12. The compound 4,4'-bis-(4-carboxybutyryl)diphenyl ether.
13. The compound 4,4'-bis-(4-carboxybutyl)diphenyl ether.

References Cited

UNITED STATES PATENTS 3,120,551 2/1964 Goldschmidt _____ 260—520
2,995,587 8/1961 Wilgus _____ 260—473
2,497,673 2/1950 Kirk.

LORRAINE A. WEINBERGER, Primary Examiner

J. H. NIELSEN, Assistant Examiner

U.S. Cl. X.R.

260—475, 515, 520, 558, 559, 999